United States Patent
Riazi et al.

(10) Patent No.: US 6,748,005 B1
(45) Date of Patent: Jun. 8, 2004

(54) METHODS AND APPARATUS FOR PROVIDING A DIRECT FREQUENCY HOPPING WIRELESS INTERFACE WITH A PERSONAL COMPUTER

(75) Inventors: Habib Riazi, Stafford, VA (US); Michael Anthony Zuniga, Fairfax, VA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/448,070

(22) Filed: Nov. 23, 1999

Related U.S. Application Data (60) Provisional application No. 60/146,723, filed on Aug. 2, 1999.

(51) Int. Cl.[7] .................................................. H04B 1/69
(52) U.S. Cl. ...................... 375/133; 375/135; 375/136; 375/267; 375/299; 375/347; 348/492; 348/496
(58) Field of Search ................................. 375/132, 133, 375/135, 136, 219, 220, 267, 299, 346, 347; 348/488, 492, 496

(56) References Cited

U.S. PATENT DOCUMENTS

| | | | | |
|---|---|---|---|---|
| 5,243,415 A | * | 9/1993 | Vance | 725/81 |
| 5,469,219 A | * | 11/1995 | Mortensen | 348/492 |
| 5,859,664 A | * | 1/1999 | Dent | 348/21 |
| 5,880,721 A | | 3/1999 | Yen | 345/327 |
| 6,128,484 A | * | 10/2000 | Singkornrat et al. | 455/420 |
| 6,130,885 A | * | 10/2000 | Izumi et al. | 370/343 |
| 6,195,797 B1 | * | 2/2001 | Williams, Jr. | 725/74 |
| 6,400,751 B1 | * | 6/2002 | Rodgers | 375/132 |

\* cited by examiner

Primary Examiner—Stephen Chin
Assistant Examiner—David B. Lugo (57) ABSTRACT

A system and method to provide cost effective, portable and convenient access to the Internet and other personal computer applications from any location within a predetermined distance from a desktop personal computer (PC). According to one aspect, a compact handheld terminal functions as a user interface device and communicates via an FM frequency hopped radio link with a base station which is located near and connected with the desktop PC. The handheld terminal allows home users to conveniently and remotely interface with their desktop PC with a freedom of movement similar to that of using a laptop PC while allowing an inexpensive network connection. The FM frequency hopped radio link carries the appropriate video, audio, keyboard and mouse signals between the desktop PC and the handheld terminal. The approach may be adapted to short range transfer of high quality video in a variety of applications.

27 Claims, 10 Drawing Sheets

| Name | Description | Signal Flow Direction |
|---|---|---|
| RED | Red Video (.7 V p-p) | PC→BS |
| GRN | Green Video (.7 V p-p) | PC→BS |
| BLU | Blue Video (.7 V p-p) | PC→BS |
| RGND | Red Ground | PC◇BS |
| GGND | Green Ground | PC◇BS |
| BGND | Blue Ground | PC◇BS |
| SGND | Sync Ground | PC◇BS |
| HSYNC | Horizontal Sync | PC→BS |
| VSYNC | Verticle Sync | PC→BS |
| MDAT | Mouse Data | PC◇BS |
| GND | Ground | PC◇BS |
| MClK | Mouse Clock | PC→BS |
| KBDAT | Keyboard Data | PC◇BS |
| KGND | Keyboard Ground | PC◇BS |
| KCLK | Keyboard Clock | PC→BS |
| AUDL | Audio Left | PC→BS |
| AUDR | Audio Right | PC→BS |
| MIC | Microphone In | PC←BS |

FIG. 11

METHODS AND APPARATUS FOR PROVIDING A DIRECT FREQUENCY HOPPING WIRELESS INTERFACE WITH A PERSONAL COMPUTER

CROSS REFERENCE TO RELATED APPLICATIONS

The present invention claims the benefit of U.S. Provisional Application Serial No. 60/146,723 filed Aug. 2, 1999 entitled "Portable Wireless Interface Device for a Personal Computer".

FIELD OF THE INVENTION

The present invention relates to improvements in remote video transfer for personal computers and other applications. More particularly, the invention relates to methods and apparatus highly suitable for providing a wireless interface for a handheld or portable unit to a remote personal computer.

BACKGROUND OF THE INVENTION

The personal computer (PC) has been one of the major technological innovations of the last several years. Initially, PCs were available only in a desktop configuration consisting of the following components: a separate display or monitor, such as a cathode ray tube, a separate enclosure for the processing electronics, various storage devices, such as hard disk, floppy disk and CD ROM, and a separate keyboard and mouse to enable user input to the PC.

In the desktop configuration, the PC components are typically arranged on a desk and are interconnected with cables to provide the electrical communication necessary for overall PC operation. Consumer demand for mobile PCs led to the development of laptop PCs in which a liquid crystal display (LCD), processing electronics, the keyboard, mouse and battery are integrated into a single, portable, compact enclosure. The requisite technology and integration underlying the successful commercialization of the laptop PC is such that the cost of the laptop PC greatly exceeds the cost of a comparably performing desktop PC. The consequences of such a cost differential are that the mobility and convenience offered by laptop PCs are typically enjoyed only by individuals whose businesses or employers require such mobility and can afford to pay the higher costs of a laptop compared to a desktop PC. The vast majority of home users, or consumers who use a PC within their homes for Internet access and for other PC applications, purchase desktop configured PCs.

Even for those home users who own and use a laptop PC, Internet access from any location within or outside of a home user's house typically requires connection to an Internet service provider through a standard landline telephone or cable, or a cellular telephone network. Both scenarios are undesirable to the home user for the following reasons. In the first scenario, it is highly unlikely that a landline telephone or cable port will be conveniently available at every location within and around the house from which the home user may wish to access the Internet. In the second scenario, the home user is forced to subscribe to cellular service, which is likely to result in substantial cellular "air time" costs during the time the user browses the Internet, as compared with a "free" local call.

Accordingly, it would be highly desirable and advantageous to provide a wireless, handheld, portable device for interfacing with a nearby personal computer, allowing low cost access to the Internet and other information services.

SUMMARY OF THE INVENTION

The present invention, working in conjunction with a desktop personal computer (PC) provides methods and apparatus to provide cost effective, portable and convenient access to the Internet and other PC applications from any location within a certain desired distance from the desktop. In one aspect, the present invention includes a compact handheld terminal which functions as a user interface device and communicates via a radio link with a base station which is located near and connected with a home user's desktop PC. The handheld terminal contains user interface components, such as a flat panel display, a pointing device, a stereo audio output connector, a microphone input connector and an optional keyboard. In addition, the handheld terminal contains a compact radio subsystem which receives appropriate video and stereo audio signals and transmits keyboard, mouse, radio channel probing and adaptive differential pulse-code modulation (ADPCM) encoded microphone signals. This subsystem includes a transmitter and a receiver, as well as an antenna. A microcontroller is also utilized to control the operation of the radio transmitter and receiver, in an advantageous frequency hopping arrangement referred to as "direct frequency modulation (FM) frequency-hopping" or "FM frequency-hopping".

The display of the handheld terminal may suitably be any compact flat panel display capable of displaying video signals. The audio output of the handheld terminal provides stereo audio signals for earphones that may be worn by the user, ensuring both high quality audio and privacy when using the handheld terminal in locations where other people are present. The handheld terminal may suitably have similar dimensions and the form factor of a typical laptop PC, except that it is of lighter weight since it will typically not have many of the additional components of a laptop, such as hard disk drives and floppy drives.

According to one aspect of the present invention, the base station is connected through cables to keyboard, mouse, audio input, audio output and video ports of the desktop PC. The base station contains suitable electronic circuitry to allow radio transmission of video graphics adapter (VGA) video and stereo audio from the desktop's VGA and audio cards to the handheld terminal using the direct FM frequency-hopping approach, thereby ensuring high quality video, audio and privacy. The base station also includes a radio receiver for receiving and demodulating keyboard, mouse, radio channel probing and microphone signals transmitted from the handheld terminal and a decoder to decode the encoded microphone signals. A microcontroller is also utilized in the base station to control the operation of the radio transmitter and receiver.

According to one aspect of the present invention, the handheld terminal serves as a portable multimedia user interface device with capabilities and features which include a video display consisting of an integral flat LCD panel, voice input with an external or internal microphone, audio output with a stereo listening device, pointing device for on screen object selection and command, an alphanumeric input device such as a keyboard, access to all the features available at the PC, and a wireless interface with the base station.

The handheld terminal of the present invention enables home users to conveniently and remotely interface with their desktop PC while maintaining the convenience and portability typical of the use of a laptop PC. The remote wireless interface is enabled by the radio link between the handheld terminal and base station which carries the appropriate video, audio, keyboard and mouse signals between the desktop PC and the handheld terminal. The rugged, lightweight handheld terminal may be easily carried around by the user and, if desired, may be left in any convenient location such as on a night table next to the home user's bed or in the recreation room.

These and other features, aspects and advantages of the invention will be apparent to those skilled in the art from the following detailed description taken together with the accompanying drawings.

DETAILED DESCRIPTION

The present invention will now be described more fully with reference to the accompanying drawings, in which several currently preferred embodiments of the invention are shown. However, this invention may be embodied in various forms and should not be construed as limited to the exemplary embodiments set forth herein. Rather, these representative embodiments are described in detail so that this disclosure will be thorough and complete, and will fully convey the scope, structure, operation, functionality, and potential of applicability of the invention to those skilled in the art.

Figure 1:
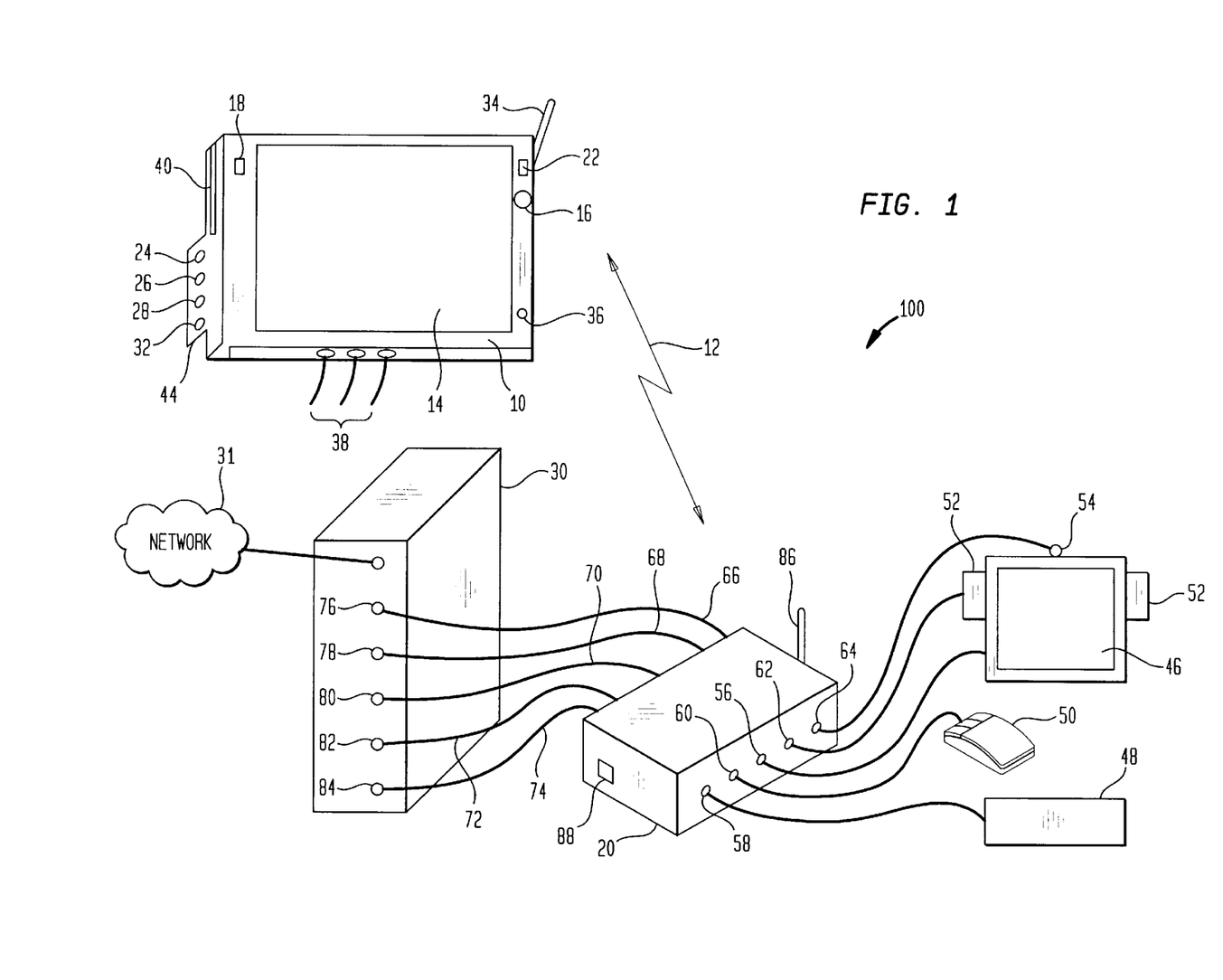
Fig. 1 shows a wireless handheld terminal, a base station and a desktop PC in accordance with the present invention.

FIG. 1 shows a wireless handheld terminal 10, a base station 20 and a personal computer (PC) 30 which together form a system 100 in accordance with the present invention. As will be described in greater detail below, the handheld terminal 10 provides a portable interface to the PC 30 utilizing a radio communications link 12 with the base station 20. The PC 30 may be suitably connected to a network 31, such as the Internet. Additionally, the PC 30 may be located in a remote location, such as a closet. While in a preferred embodiment, the base station 20 is disclosed as an external device connected to PC 30, one skilled in the art would appreciate that the base station 20 of the present invention may also be integrated into the PC 30, provided on an adapter card suitable for inserting into a PC expansion slot, or attached to the PC 30 in other suitable ways.

Figure 2:
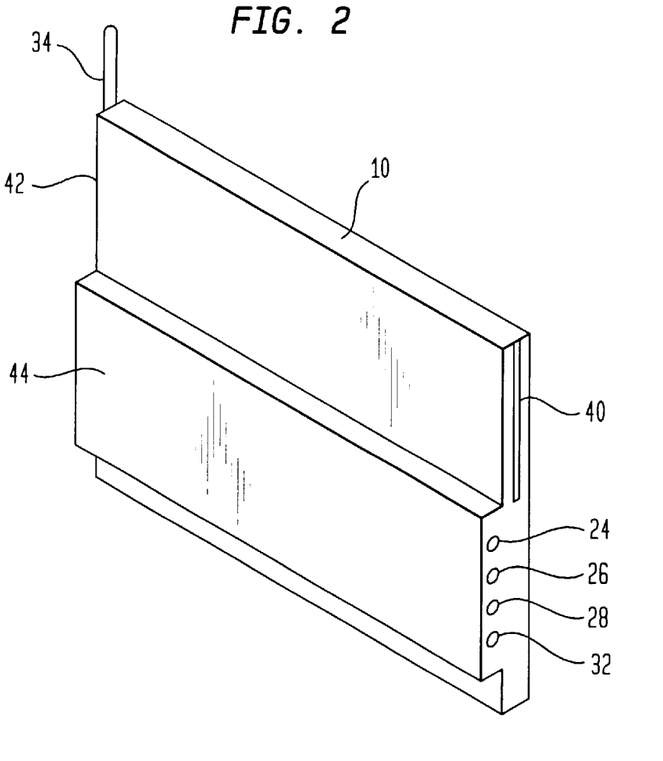
FIG. 2 shows a rear view of a wireless handheld terminal in accordance with the present invention.
Figure 5A:
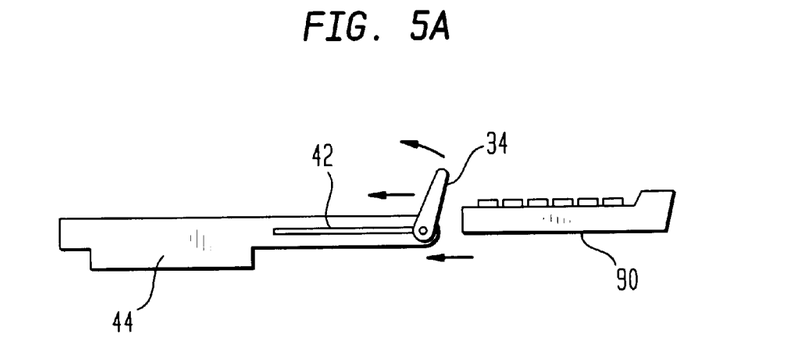
FIGS. 5A, 5B, and 5C show, respectively, side, front and top views of a wireless handheld terminal and detachable keyboard in accordance with the present invention.
Figure 5B:
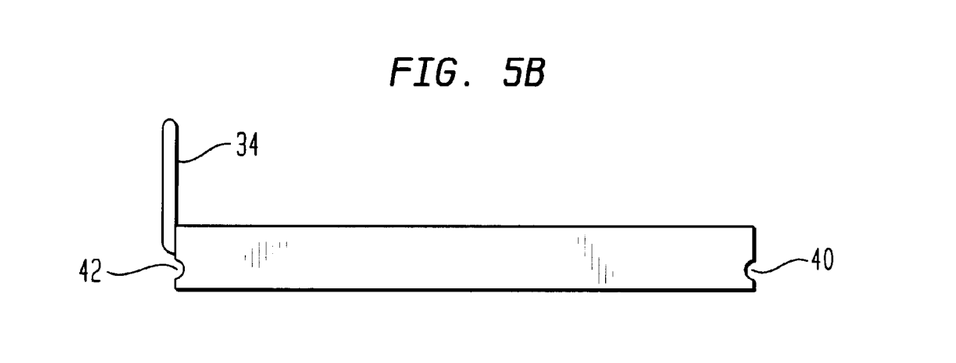
Figure 5C:
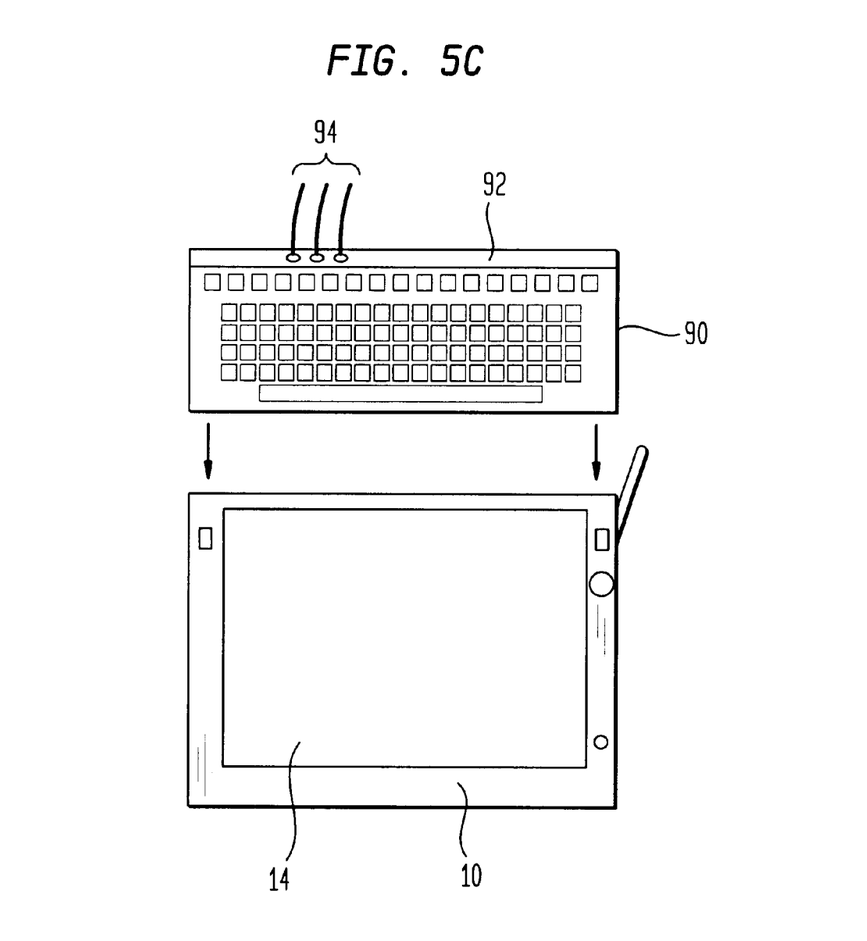

FIG. 2 shows a rear view of the wireless handheld terminal 10 in accordance with the present invention. Referring to FIGS. 1 and 2, the handheld terminal 10 includes a flat panel display 14, such as a thin film transistor LCD display, and a cursor pointing device 16 which may suitably consist of a trackball, a touch pad, or similar device. Associated with the cursor pointing device 16 are a left button 18 and a right button 22. The terminal 10 also includes a headphone output port 24, a microphone input port 26, a power source port 28, a keyboard port 32, and a compact antenna 34. An on and off switch 36 controls the power for the handheld terminal 10 which will preferably be provided by a battery not shown. In an alternative embodiment, the switch 36 also remotely controls the power for the desktop PC 30 by transmitting appropriate control signals through the base station 20. Metallic conductors 38 are located on a bottom edge of the terminal 10. A component storage volume in body 44, as described further below, provides space for electronic components included in the terminal 10. As seen in FIGS. 1, 5A and 5B, grooves 40 and 42 are located on opposing sides of the terminal 10.

Referring again to FIG. 1, the base station 20 connects the PC 30 to a desktop PC monitor or display 46, a desktop keyboard 48, a desktop PC mouse 50, desktop PC stereo speakers 52, and a desktop microphone 54. The base station unit 20 includes connector ports 56, 58, 60, 62 and 64 connected, respectively, to the monitor 46, the keyboard 48, the mouse 50, the speakers 52, and the desktop microphone 54. The base unit 20 also includes connectors 66, 68, 70, 72 and 74 which connect to a desktop PC VGA video port 76, a mouse port 78, a keyboard port 80, a stereo audio output port 82, and a microphone input port 84, respectively, located in the back panel of PC 30. A compact antenna 86 is utilized for transmitting and receiving radio signals. An on and off switch 88 controls power for the base unit 20. Further details of the base station 20 are provided below.

Figure 3:
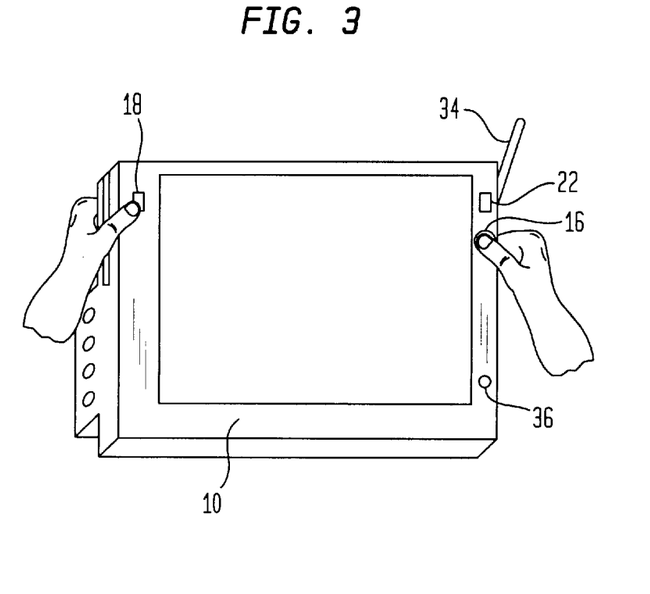
FIG. 3 illustrates a wireless handheld terminal showing portable operation in accordance with the present invention.
Figure 4:
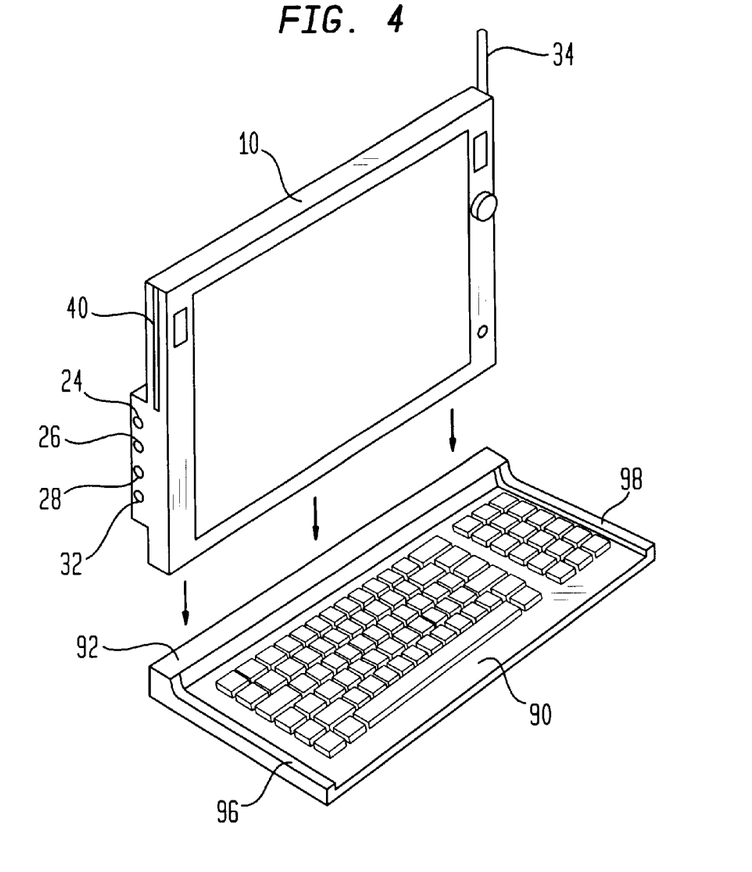
FIG. 4 shows a wireless handheld terminal and a detachable keyboard in accordance with the present invention.

FIG. 3 illustrates a wireless handheld terminal showing portable operation in accordance with the present invention, and shows its ease of use and high degree of portability. The cursor pointing device 16, the left button 18 and the right button 22 are preferably located on the sides of the handheld terminal 10 to enable easy manipulation and operation by a user without the need for a desktop or other support for the terminal 10. A user can easily hold and operate the handheld terminal 10 for browsing the Internet or performing other tasks as shown in FIG. 3. The user's hands grasp the left and right sides of the handheld terminal 10. Held in this manner, the user's right thumb can readily operate the cursor pointing device 10 and the right mouse button 22. At the same time, the user's left thumb can easily operate the left mouse button 18.

As shown in FIGS. 4–7, the handheld terminal 10 may be used with an optional small keyboard 90. The keyboard 90 allows the user to enter keyboard-based commands as needed for e-mail, word processing and other PC based software applications.

In an embodiment of the handheld terminal 10 shown in FIGS. 4, 5A, 5B, and 5C, a bottom edge of the handheld terminal 10 is inserted and locks into an opening 92 at the rear of the keyboard 90, presenting the user with a laptop-like configuration for viewing the display 14 while typing at the keyboard 90. When the handheld terminal 10 and keyboard 90 are so engaged, electrical contact is made between metallic conductors 38 on the bottom edge of the handheld terminal 10 and spring loaded conductors 94, shown in FIG. 5C, disposed in the opening 92. This connection allows the keyboard signals to be provided to the appropriate electronics within the terminal 10. The optional keyboard 90 may be conveniently stored on and operated in conjunction with the handheld terminal 10 in a variety of ways that enable convenient, integrated portability of both the keyboard 90 and the handheld terminal 10. As shown in FIG. 5A, the keyboard 90 slides down onto the top of the handheld terminal 10, with keyboard flanges 96 and 98, shown in FIG. 4, sliding onto the grooves 40 and 42, respectively.

Figure 6A:
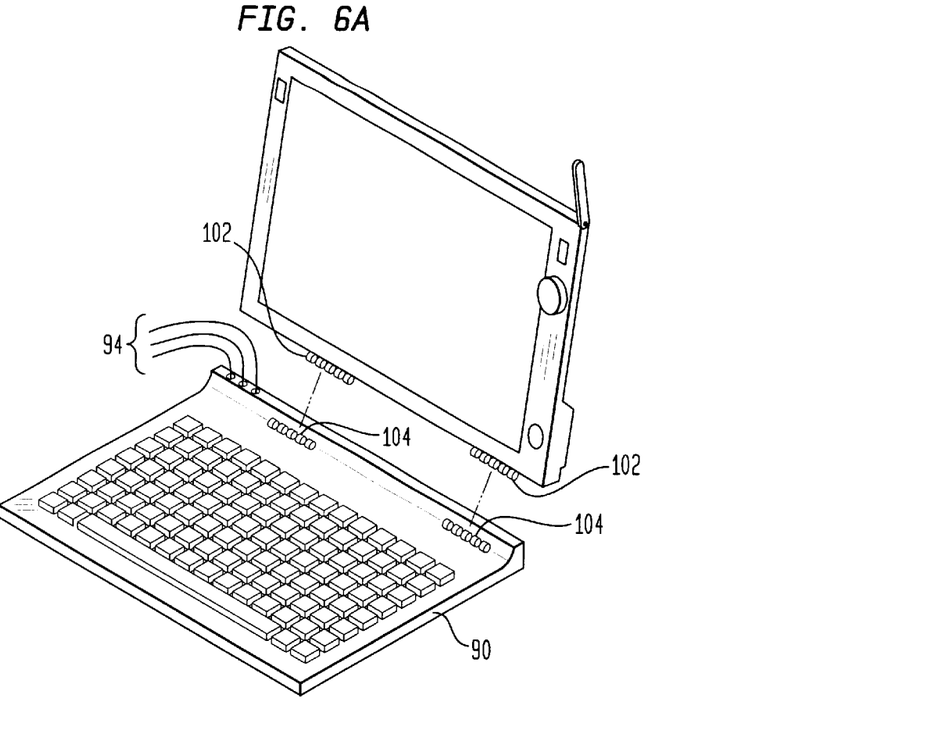
FIGS. 6A and 6B show, respectively, perspective and side views of a wireless handheld terminal in accordance with the present invention.
Figure 6B:
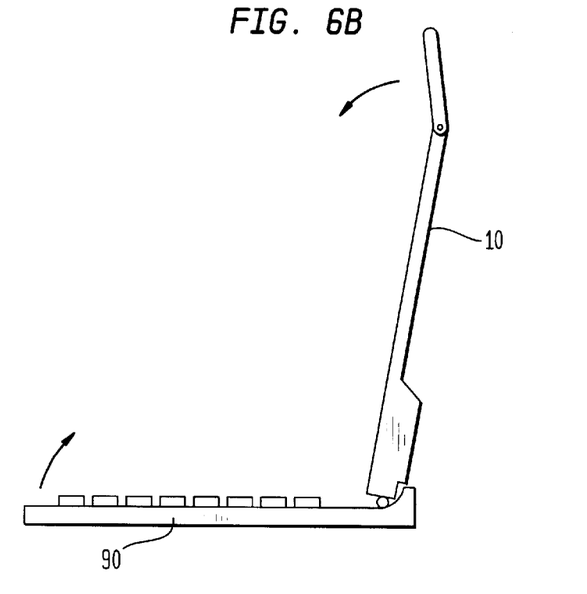

In an alternative embodiment shown in FIGS. 6A and 6B, the handheld terminal 10 includes female hinges 102 disposed on the bottom edge of terminal 10. The female hinges 102 are adapted to engage male hinges 104 of the keyboard 90, allowing metallic conductors 38 of the terminal 10 to contact conductors 94 of the keyboard 90 such that the keyboard signals are transmitted to the terminal 10. The hinges 102 and 104 advantageously allow the keyboard 22 to rotatably close to protectively cover the display 14 when not in use.

Figure 7:
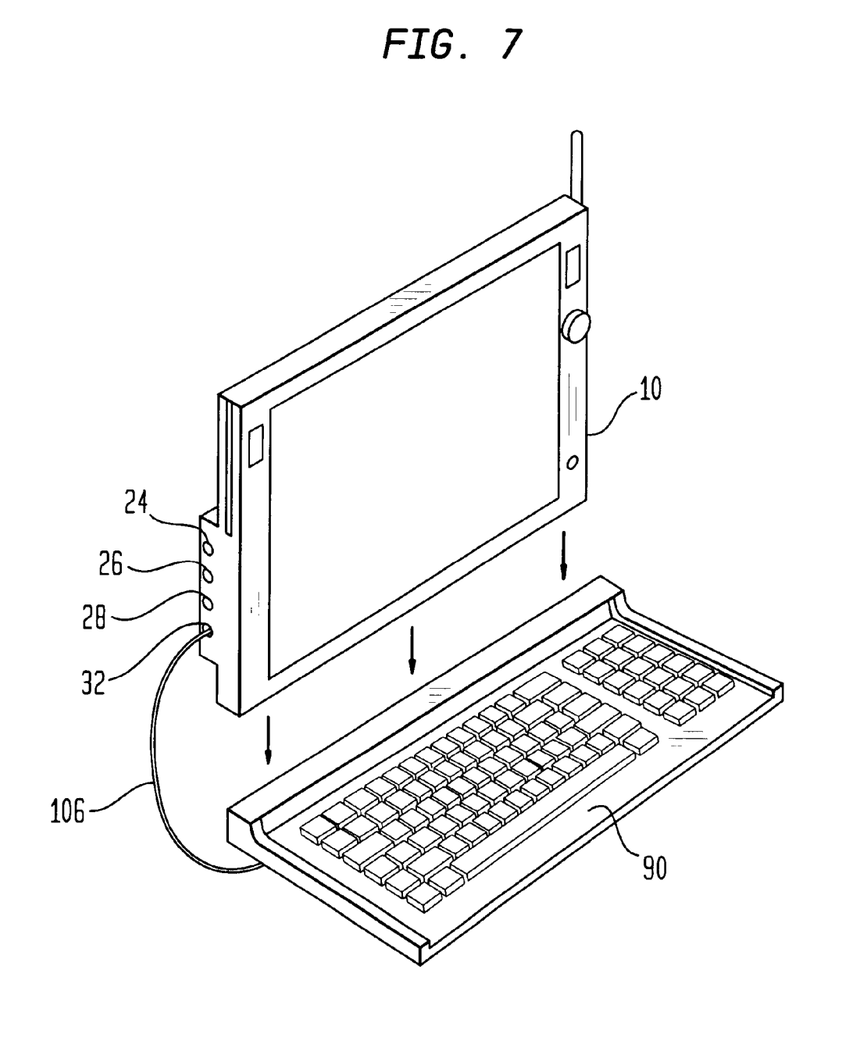
FIG. 7 shows a perspective view of a wireless handheld terminal, a keyboard, and a connecting cable in accordance with the present invention.

In some situations, the user may not want to physically connect the handheld terminal 10 and the keyboard 90. The user may want to use the keyboard 90 positioned adjacent to the terminal 10. For such a situation, as shown in FIG. 7, the handheld terminal 10 may be suitably connected to the keyboard 90 with a standard keyboard cable 106. One end of keyboard cable 106 is inserted into the keyboard port 32. This allows a user the freedom to place the handheld terminal 10 in a variety of positions while the keyboard 90 is immediately in front of the user. When not in use, the cable 106 may be stored in a slot on the bottom of keyboard 90, and thus kept out of the way.

An external microphone may be connected through microphone port 26 to provide voice commands to the desktop PC 30 and for other audio input. Alternatively, an internal microphone may be utilized. Significantly, the handheld terminal 10 is readily usable for access to Internet telephony, and thus with the inclusion of the microphone, a headphone or other audio output device, the handheld terminal 10 can be used as a cordless Internet voice telephone. Additionally, the handheld terminal can receive video to function as a video telephone.

Figure 8:
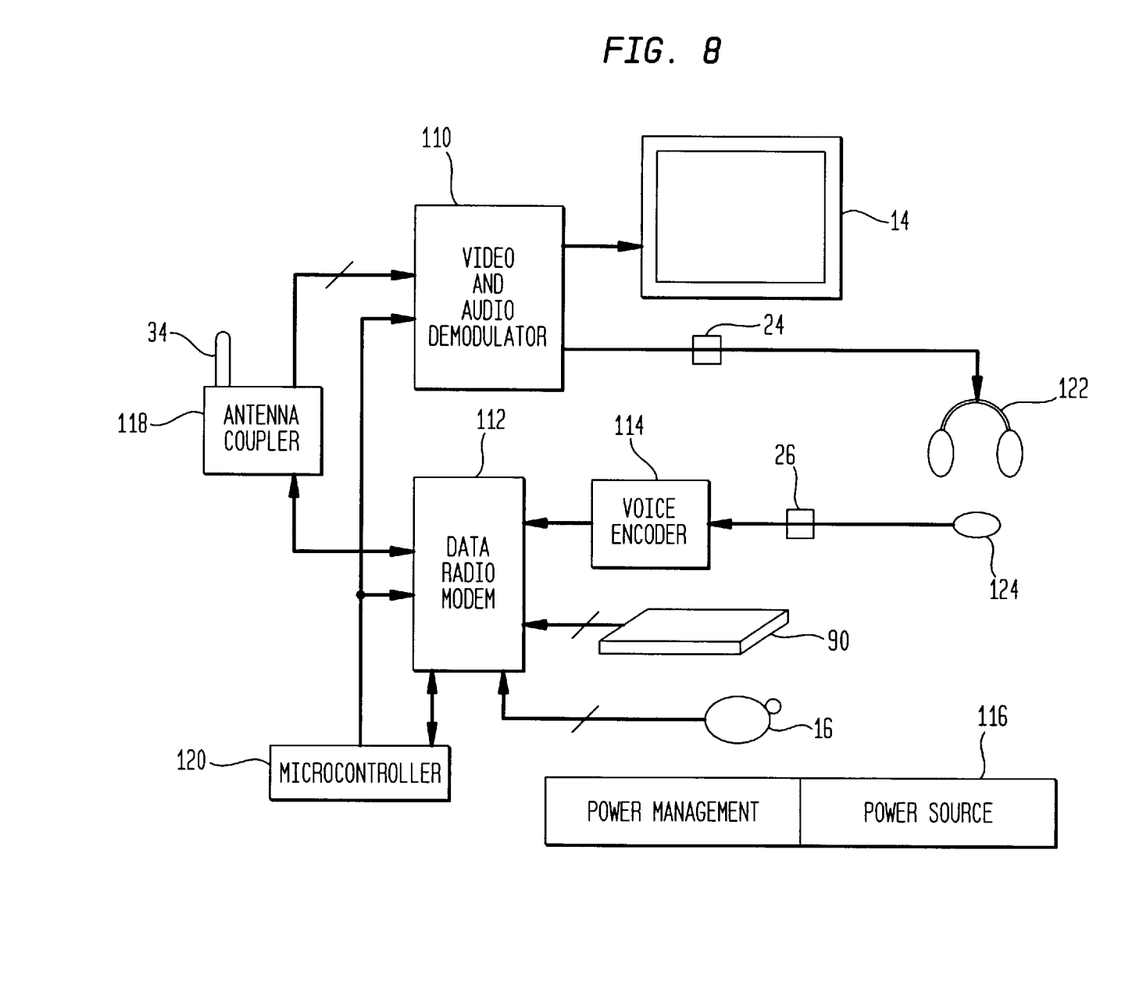
FIG. 8 shows a block diagram of a wireless handheld terminal in accordance with the present invention.

FIG. 8 shows a block diagram of the handheld terminal 10 in accordance with the present invention. A video-audio receiver and demodulator 110, a data radio modem 112, an adaptive differential pulse-code modulation (ADPCM) voice encoder 114, and a battery power source 116 may be suitably housed within the thicker portion of the body 44 on the rear of the handheld terminal 10. An antenna coupler 118 connects the compact antenna 34 to the data radio modem 112 and the video-audio receiver and demodulator 110. The video-audio receiver and demodulator 110 is further connected to the display 14, the headphone output port 24, and a microcontroller 120. The data radio modem 112 is further connected to the microcontroller 120, the encoder 114, the optional keyboard 90 where utilized, and the cursor pointing device 16. A headphone 122 is connected to the port 24. A microphone 124 is connected to the microphone port 26.

The antenna coupler 118 contains the circuitry to electrically match the antenna 34 to the video-audio receiver and demodulator 110 and the data modem 112. The antenna 18 may be of stick or patch design to make it radiation efficient and aesthetic in appearance.

The video displayed on the display 14 replicates the video which would be displayed by the local PC monitor 46 if the terminal were not in use and the user was utilizing the PC 30. Inputs to the display 14 from the video-audio receiver and demodulator 110 include red, green, and blue video signals as well as vertical and horizontal synchronization, or sync, signals which are transmitted from the base station 20 in a manner described below. The video-audio receiver and demodulator 110 receives and demodulates the video and audio information sent from the base station 20. In a preferred embodiment, the receiver and demodulator 110 converts three RF signals received from the base station 20 into red, blue and green signals transmitted to the display 14 and to the left and right audio channel signals transmitted to the headphone output port 24.

The encoder 114 is preferably a low bit rate voice grade coder and decoder, such as ADPCM. The encoder 114, in conjunction with the data modem 112 and the microphone 124, provides a voice channel for audio transmission to the base station 20. The encoder 114 converts the voice analog signal received from microphone port 26 to a digital signal which is then transmitted through the FM frequency-hopped RF data sync modem 112 to the base station 20.

The pointing device 16, along with the associated buttons 18 and 22, give the user the pointing and selecting capability for objects on the screen. The pointing device 16 receives a clock input and utilizes a bidirectional data bus for serial data communication through the data modem 112 as described below.

The optional keyboard 90 enables a user to enter text inputs and commands while using the handheld terminal 10. The keyboard 90 also communicates with the data modem 112 utilizing synchronous data and clock lines. The data modem 112 provides the communication link for the keyboard 90 to the base station 20 and through the base station 20 to PC 30.

The data modem 112 operates in a frequency division multiplexing (FDM) mode and preferably uses the direct FM frequency-hopping approach described below. The data modem 112 provides the communication link to the base station 20 for the pointing device 16 and the keyboard 90, as well as receiving synchronization signals for the video display 14. Coded voice data from the output of the voice encoder 114 and a known sequence generated by the microcontroller 120 for channel assessment are also transmitted via the data modem 112. The data modem 112 also receives frequency hop information from the base station 20, which is then translated to a hop command by the microcontroller 120.

The microcontroller 120 controls the hopping frequencies for the radio modem 112. The microcontroller 120 also initiates a turn-on process, as described below. Immediately after turn on, the data modem 112, controlled by the microcontroller 120, sends a signal to the base station 20 on a random preselected carrier and begins hopping with a hop frequency. The microcontroller 120 also generates a known bit stream used for the channel assessment.

The power source 116 includes a rechargeable battery and power management circuitry to shut down unnecessary parts of the electronics utilized in portable terminal I during standby or when not in use. As in any portable battery operated device, battery lifetime is an important parameter. The power management circuitry of the power source 116 minimizes the average power drain and supplies a constant voltage during the entire charge life of the battery.

Figure 9:
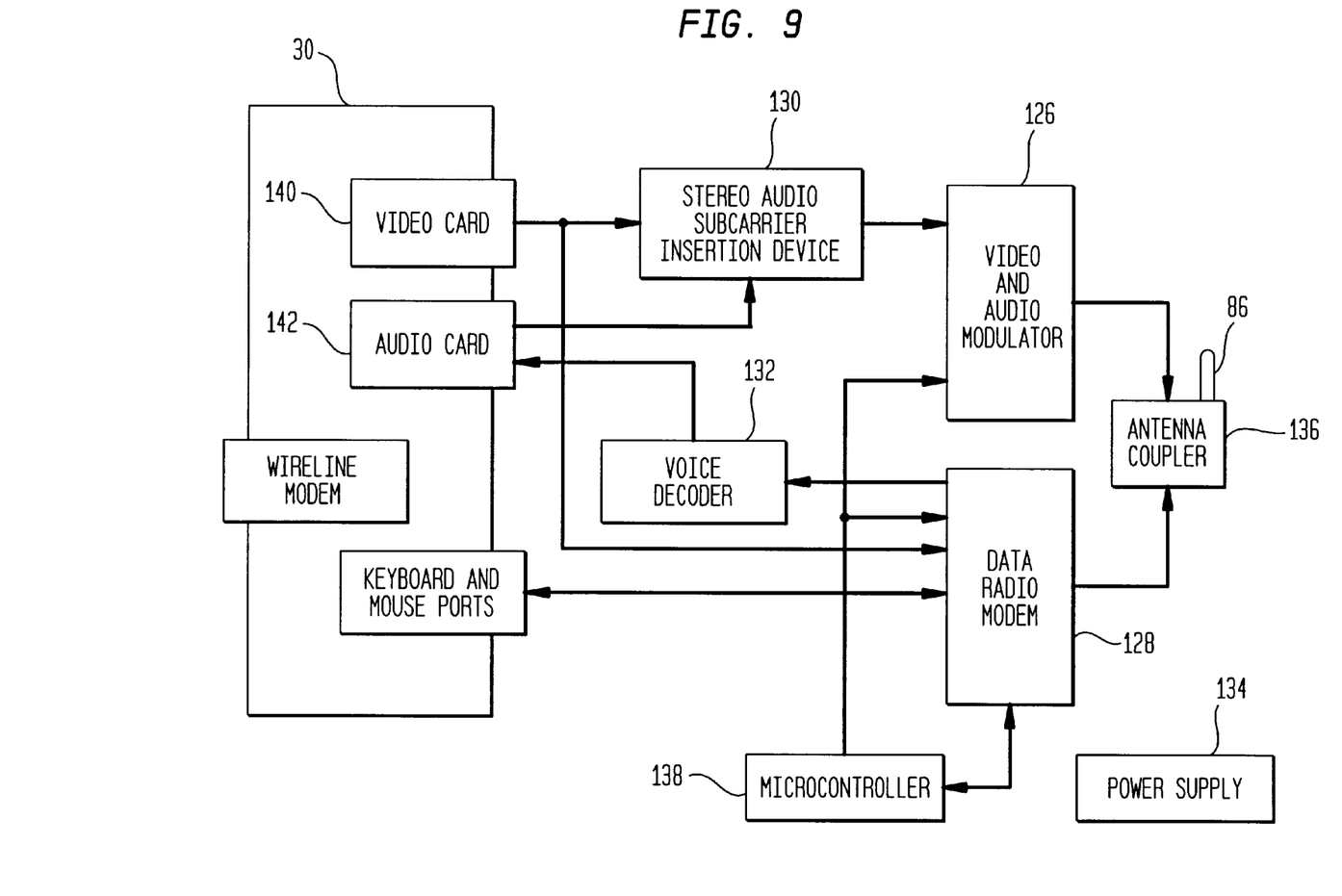
FIG. 9 shows a block diagram of a base station in accordance with the present invention.

Referring to FIGS. 1 and 9, the base station unit 20 includes a video and stereo audio modulator and transmitter 126, a data radio modem 128, an electronic device 130 for inserting stereo audio subcarriers, a low bit rate voice decoder 132, and a power supply 134. An antenna coupler 136 connects the antenna 86 to the modulator 126 and the radio modem 128. A microcontroller 138 is connected to the radio modem 128 and the modulator 126. The radio modem 128 and the insertion device 130 are connected through a port and connecting cable to a video card 140 of the PC 30. An audio card 142 of the PC 30 is also connected through a port and connecting cable to the device 130 and the decoder 132. Keyboard and mouse ports of the PC 30 are connected through cables to corresponding connection ports for the radio modem 128. The antenna coupler 136 provides a summing function for all the RF outputs to the antenna 86 and a reverse path from the antenna 86 to the data modem 128.

When the handheld terminal 10 is not turned on, the base station 20 provides direct electrical connection of the desktop PC 30, including the monitor 46, the keyboard 48, the mouse 50, the multimedia speakers 52 and microphone 54, to the appropriate connectors on the back of PC unit 30, thus allowing normal desktop operation. When both the desktop PC 30 and the handheld terminal 10 are on, the user of the handheld terminal 10 is able to remotely interface with the desktop PC 30. The home user has the option of remotely shutting down the desktop PC 30 and putting the base station 20 into sleep mode utilizing a software shutdown command transmitted from the handheld terminal 10.

As described above, the primary function of the base station 20 is to access certain user interface information from the desktop PC 30 and communicate this to the remote handheld terminal 10 while simultaneously receiving certain user interface information from the handheld terminal 10 and communicating this information to the desktop PC 30. The base station 20 accesses and provides the requisite information by interfacing with the desktop PC 30 through its normal audio, video, keyboard and mouse ports.

Referring again to FIG. 9, the insertion device 130 uses a frequency division multiplex technique to insert left and right audio channels on a sub-carrier frequency which will be transmitted with two of the three video signals via the FM, frequency-hopped RF video and audio modulator 126. The device 130 receives video signals and audio channels from the video card 140 and the audio card 142, respectively, which are both contained in the PC 30.

Encoded voice signals are transmitted to base station 20 by the terminal 10 and received by the data modem 128. The low rate voice grade coder and decoder 132, utilizing a technique such as ADPCM, decodes the encoded voice signals received from the data modem 128. The decoded voice signals are then provided to the audio card 142.

The video and audio modulator 126 comprises three analog direct FM, frequency-hopped modulators which enable a simple, low cost and effective means of transmitting the video and audio signals from the desktop PC 30 to the handheld terminal 10. The video and audio modulator 126 provides a radio link which utilizes low transmission power and which is both secure and robust, transmitting the video signal over three frequency hopped channels, as described below.

Increasing bandwidth at a given information rate decreases the power requirement. This means that low power, wide bandwidth video transmission necessitates increasing the transmission bandwidth by spreading the carrier energy. To achieve this end without the need for an expensive video encoder and encoder, the present invention preferably utilizes three complementary techniques.

First, separate channels are used to transmit the red, blue, and green video signals provided by the PC VGA card 140. Each of these signals is separately frequency modulated onto a different carrier so that their individual modulated spectra do not overlap. This separate carrier approach provides three times as much bandwidth for the video signal since video information is contained in all three channels.

Second, using three channels requires relatively little FM deviation for each carrier. For example, while a deviation ratio of 1:5 is typical for commercial FM broadcasting, the present invention attains substantially smaller deviation ratios, even ratios approaching 1:1, by sending ⅓ of the video information over separate channels. Such a deviation ratio allows the bandwidth of the individually modulated spectra to be about 5 MHz or less. Such a value is less than the coherence bandwidth of a typical in-house or in-building radio channel. Thus, potential fading of the individual spectra is flat rather than frequency selective. The transmission arrangement is inherently robust since it sends ⅓ of the video information through separate frequency channels which are intelligently hopped in frequency to ensure high fidelity video transmission to the handheld terminal 10.

Third, intelligent frequency hopping is achieved by using the data modem 12 in the handheld terminal 10 to send known bits through the radio channel. The transmitted bits allow base station microcontroller 138 to determine the transmission quality of the channel at particular frequencies in either the 2.4 GHz or 5 GHz bands. This determination allows an adaptive and intelligent selection of the FM carrier hop frequencies for each of the three video signals to avoid non-favorable channel conditions, such as flat fading, excessive loss, and interference.

This radio technique satisfies the low power requirements as well as those of robustness and security of radio transmission through diversity, hopping, and channel condition evaluation. These advantageous techniques, in conjunction with direct FM modulation, are preferably utilized for their simplicity, low cost, low distortion, and as not requiring an up-banding mixer or a video encoder and decoder.

The video and audio modulator 126 preferably comprises three electronically tunable oscillators (VCOs) and three phase locked loops (PLLs) to determine the three carrier frequencies. The PLL carrier frequencies are set by a digital control signal from the microcontroller 138, which generates the hop command. This signal sets the carrier frequencies of the tunable oscillators to frequencies in the desired transmission band, such as 2.4 GHz or 5 GHz. Once the hop command is completed, the VCO carrier control voltages supplied by the PLLs enter an interlock state until the next frequency hop. The modulation voltages are then applied as secondary control voltages to the VCOs. The time at which hopping occurs for the video modulators is set to occur during with the vertical-blanking interval when the video information is not sent.

The data channel radio modem 128 is a frequency division, duplex radio that enables two way data communication. The data channel radio modem 76 packs the data into a quasi-time division multiplexing (TDM) frame to accommodate transmission of certain required information from the base station 20 to the handheld terminal 10, referred to as the "forward link", and from the handheld terminal 10 to the base station 20, referred to as the "reverse link". Quasi-TDM describes a technique whereby some data can be sent through the data modem without being digitized. For example, video synchronization pulses, which are not digitized data, are inserted with an amplitude compatible with the rest of the data. Both the forward link and the reverse link channels utilize a bandwidth as low as 100 kHz. On the forward link, the base station data modem 128 transmits the following information to the handheld terminal data modem 112 on a forward link carrier: video vertical synchronization, video horizontal synchronization, monaural audio output from the desktop PC 30, data required by the optional keyboard 90, data required by the mouse 16, synchronization signals for keyboard 90 and mouse 16, and frequency hop data.

On the reverse link, the data modem 112 within the handheld terminal 10 transmits the following information to the base station data modem 128 on a reverse link carrier frequency: voice data as encoded by low rate encoder 132, data for keyboard 90, data for mouse 16, and channel pilot and probing data.

For proper display, the video synchronization is sent in real time, establishing a superframe, the interval between two consecutive vertical sync pulses, having a duration of about 16 milliseconds, with sub-frames established by the horizontal sync pulses. Voice, keyboard, mouse, and pilot data are then packetized and assembled in a sub-frame structure. The data modem 112 includes necessary logic to assemble and disassemble the transmission frames. Like the video and audio modem 126, the data modems 112 and 128 also use the novel FM frequency-hopped technique.

The base station microcontroller 138 assigns the hopping frequencies utilized by the base station 20 and the handheld terminal 10, as described below. The data modem 128, controlled by the microcontroller 138, hops with a hop frequency at an integer fraction of the horizontal frequency, preserving uninterrupted delivery of the video synchronization to the handheld terminal. Either of the duplex data modem carriers are set within the allowed band of operation, excluding the portions occupied by the video and audio modem and with appropriate guard bands for acceptable adjacent channel interference. Since the data modem 128 requires less bandwidth than the video and audio modem 126, the data modem 128 sweeps the remaining available band many times between two consecutive vertical sync pulses. During these sweeps, the base station microcontroller 138 determines the next location for the video and audio channel carriers by comparing the received channel pilot data with the known pilot data transmitted over the reverse link by the handheld terminal 10. This comparison enables a quantitative assessment of the channel transmission quality to be made and, hence provides a means for determining the next frequency hop for the FM carriers. This determined frequency hop information is sent to the video and audio modulator 126 in the base station 20 and to the handheld terminal 10 via the forward link data channel. The video and audio modulator 126 and the corresponding receivers in the handheld terminal 10 will then hop to the newly assigned frequencies during the next vertical blanking period.

Figure 10:
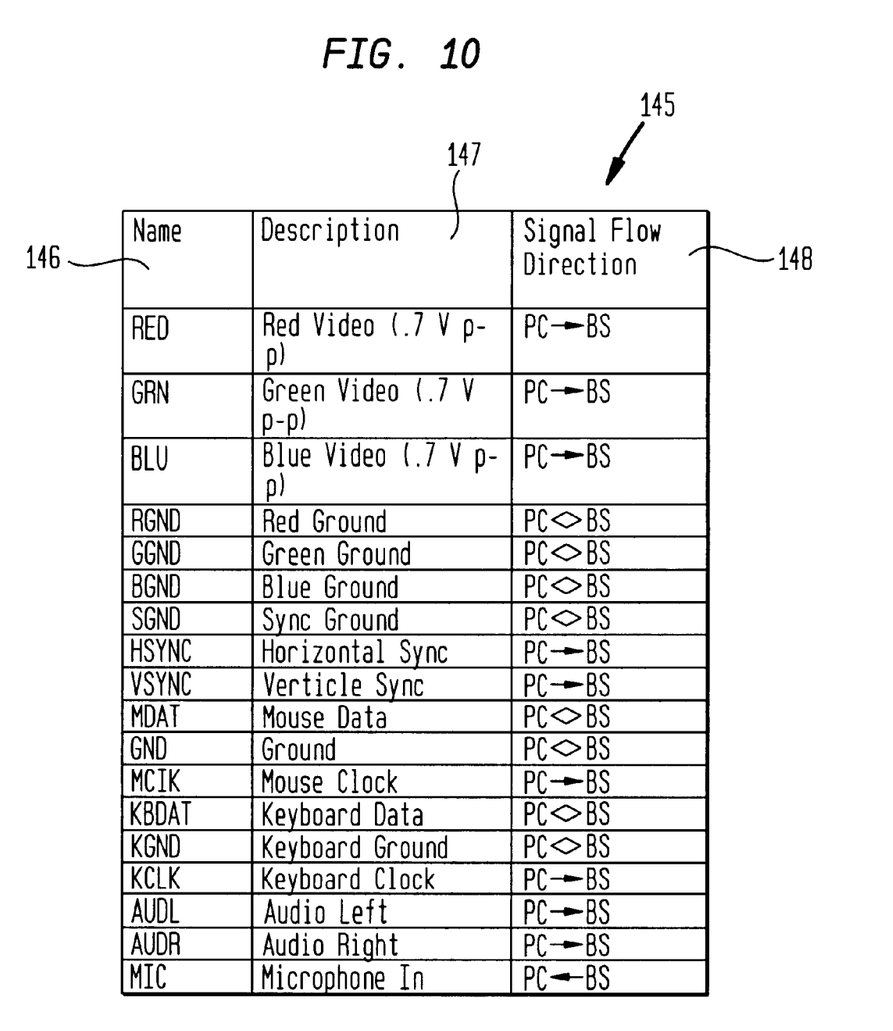
FIG. 10 shows a list of signals used in communication between a personal computer and a base station in accordance with the present invention.

FIG. 10 shows a signal connection table 145 having columns 146, 147 and 148. Column 146 includes an abbreviated signal connection name, RED, GRN, BLU, RGND, GGND, BGND, SGND, HSYNC, VSYNC, MDAT, GND, MCLK, KBDAT, KGND, KCLK, AUDL, AUDR and MIC, for each of the signals flowing between PC 30 and base station 20 in a presently preferred embodiment of the invention. Descriptions of these signals are found in column 147 of table 145, and the signal flow direction is indicated in column 148 of table 145 where a right arrow indicates flow from PC 30 to base station 20, a left arrow indicates flow from base station 20 to PC 30, and a diamond indicates flow in both directions.

Figure 11:
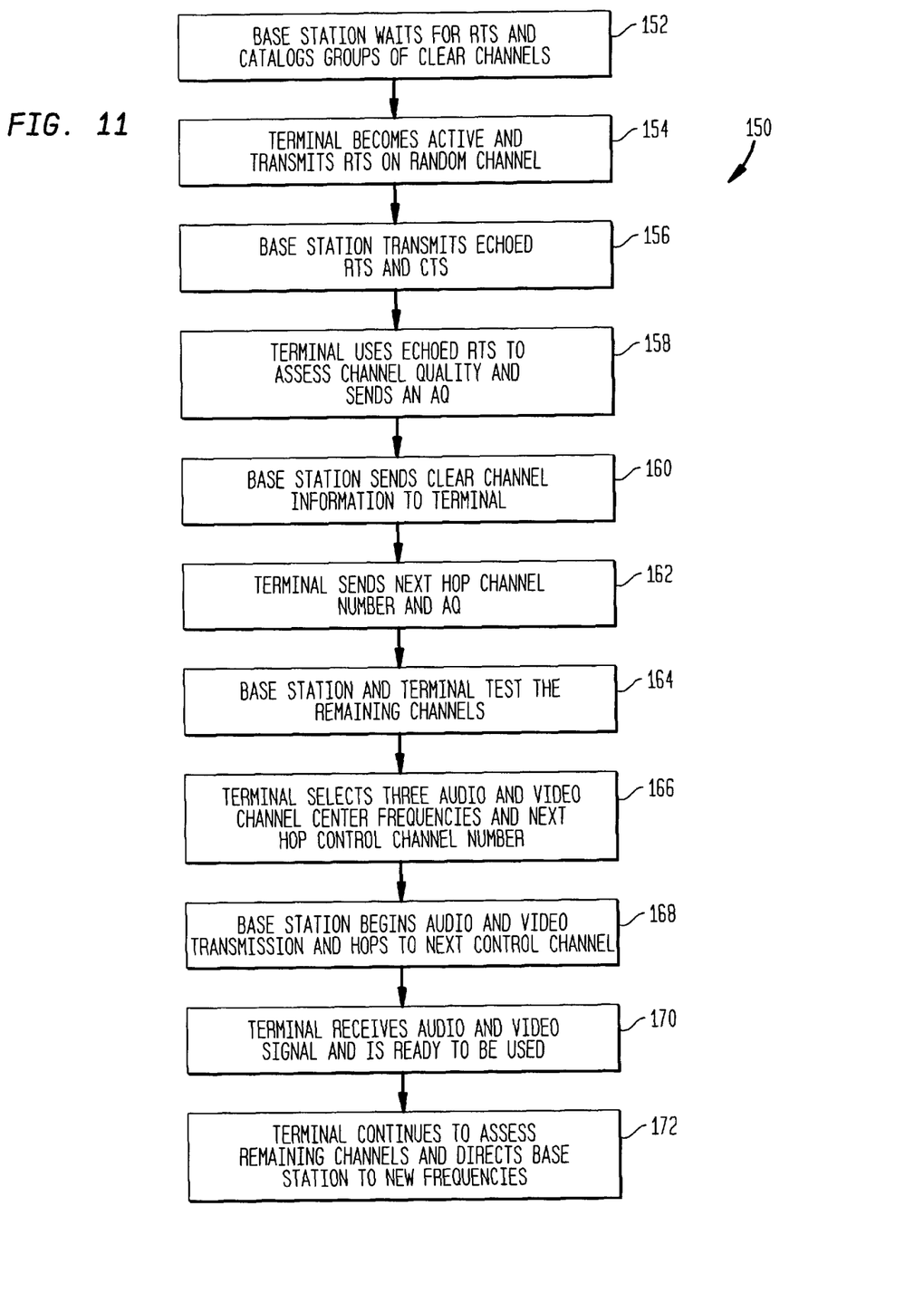
FIG. 11 shows a method of communicating between a base station and a handheld terminal in accordance with the present invention.

FIG. 11 shows a method 150 of communicating between a base station, such as base station 20, and a handheld terminal, such as handheld terminal 10, in accordance with the present invention. The method 150 utilizes five FM frequency hopped communication channels, including three one-way video and audio communication channels from the base station to the terminal, a base station to terminal control channel, and a terminal to base station control channel. Each video and audio channel may suitably include a 5 MHz bandwidth and each control channel may suitably include a 1 MHz bandwidth. It will be recognized other bandwidths may be employed for these channels. Further, while method 150 will be described in terms of a system comprising 80 1 MHz channels and operating at 2.4 GHz or 5 GHz, other channel combinations and operating regions may also be employed without departing from the spirit of the present invention.

In a first step 152, the base station waits for a request to send (RTS) signal from the handheld terminal. During this step, no signal is transmitted from the base station to the handheld terminal on the three audio and video channels. A base station data radio modem, such as data radio modem 128, is hopping through the 80 1 MHz channels, listening for an RTS signal. The data radio modem also catalogs groups of five adjacent 1 MHz channels that are not in use by another device. These groups of five adjacent 1 MHz channels may be employed as a 5 MHz bandwidth video and audio channel.

In step 154, a user turns the handheld terminal on or attempts to use the terminal, and the handheld terminal transmits two RTS signals on a random channel. In step 156, the base station receives at least one of the RTS signals. The base station radio modem then transmits an echoed RTS signal and a clear to send (CTS) signal to the handheld terminal. In step 158, the handheld terminal uses the echoed RTS signal to assess the channel quality and sends an acknowledgement (AQ) signal to the base station. In step 160, the base station receives the AQ signal and sends information about the clear channel to the terminal. Next, in step 162, the handheld unit receives the channel information and sends to the base station an AQ signal and the next data channel it will hop to. In step 164, the terminal and the base station test the remaining channels until all clear channels have been assessed.

The base station catalogs all of the good groups of five consecutive channels and transmits this information to the terminal. Next, in step 166, the terminal determines three video and audio channel center frequencies to be used for communication and transmits this information to the base station, along with the next data channel to be hopped to. In step 166, the terminal also tunes a video and audio demodulator, such as video-audio demodulator 112, to the three center frequencies in preparation of receiving a transmission from the base station. In step 168, the base station receives the three center frequencies, tunes a video-audio modulator, such as video-audio modulator 126, to the three groups of five channels corresponding to the three center frequencies, and begins transmission of the video and audio signals. The base station also hops to the next data channel indicated by the terminal. In step 170, the handheld terminal receives the video and audio signals.

The handheld terminal is now ready to be used by the user. In step 172, the handheld terminal continues to assess the 65 remaining channels not currently used by the video and audio signals, transmitting to the base station the next frequency to hop to. The handheld terminal periodically determines new center frequencies to hop to and transmits this information to the base station. This hopping of the video and audio signals occurs at most every video frame, or once every 1/60 of a second. The modulator and demodulator tune to the new center frequencies during the blanking interval of the video signal.

The foregoing discussion discloses and describes exemplary methods and embodiments of the present invention. As will be understood by those familiar with the art, the invention may be embodied in other specific forms without departing from the spirit or essential characteristics thereof. By way of example, although a presently preferred low cost portable terminal is described herein, it will be recognized that the communication system of the present invention could be built into an otherwise standard laptop allowing it to remotely connect with a desktop connected to a telephone line or the like. Similarly, the communication system can be employed to network multiple PCs to a server connected to a highspeed data link. Accordingly, the disclosure of the present invention is intended to be illustrative, but not limiting, of the scope of the invention, which is set forth in the following claims.

We claim:

1. A base station for providing a frequency hopped radio frequency (RF) communication link between a fixed unit producing a video signal and a remote terminal, the base station comprising:

apparatus for connecting to the fixed unit and receiving the video signal produced by the fixed unit; and communication circuitry for communicating with the remote terminal using the frequency hopped RF communication link such that when the remote terminal is in an active state the video signal produced by the fixed unit is transmitted to the remote terminal utilizing the RF communication link, the video signal comprising a red color signal, a green color signal and a blue color signal, the communication circuitry adapted to transmit the red color signal on a first frequency, the green color signal on a second frequency and the blue color signal on a third frequency, said communication circuitry transmitting to the remote terminal video synchronization signals on a fourth frequency different from the first frequency, the second frequency and the third frequency.

2. The base station of claim 1 wherein the communication circuitry is further adapted to perform the frequency hop during a blanking interval of the video signal.

3. The base station of claim 1 wherein the communication circuitry is further adapted to:

transmit terminal control data to the terminal on a forward link; and receive base station control data from the terminal on a reverse link.

4. The base station of claim 1 wherein the base station further comprises:

a processor for:

assessing channel quality of a predetermined number of frequencies; and selecting frequencies used to transmit the video signal based on the assessed channel quality of the predetermined number of frequencies.

5. The base station of claim 4 wherein the processor controls frequency hopping of the communication circuitry among a predetermined number of frequency channels.

6. The base station of claim 1 wherein the fixed unit is a personal computer (PC) and the base station further comprises:

a port for connecting to an audio output port of the PC and receiving an audio signal produced by the PC; and the communication circuitry is further adapted for transmitting the audio signal to the remote terminal using the RF communication link.

7. The base station of claim 6 wherein the audio signal comprises a left audio signal and a right audio signal, and the left audio signal is transmitted on sub-carrier frequencies of one of the first frequency, the second frequency, and the third frequency along with a first corresponding color signal, and the right audio signal is transmitted on sub-carrier frequencies of a different one of the first frequency, the second frequency, and the third frequency along with a second corresponding color signal.

8. The base station of claim 1 wherein the base station is disposed within the fixed unit.

9. The base station of claim 1 wherein said communication circuitry receives from the remote terminal user interface signals on a fifth frequency.

10. The base station of claim 1 wherein the communication circuitry transmits frequency hopping data on the fourth frequency.

11. The base station of claim 10 wherein the frequency hopping data is digitized data and the video synchronization signals are not digitized.

12. A lightweight, portable terminal for communicating with a base station to remotely access a fixed unit producing a video signal, the terminal comprising:

communication circuitry for communicating with the base station utilizing a frequency hopped radio frequency (RF) communication link;

a video display for displaying the video signal produce by the fixed unit and transmitted to the terminal utilizing the frequency hopped RF communication link; and wherein the frequency hopped RF communication link comprises a predetermined number of frequency channels for carrying video synchronization signals and three color video signals with the video synchronization signals being carried by one of the predetermined number of frequency channels, and with each of the three color video signals being carried by one of the predetermined number of frequency channels and wherein the video synchronization signals are transmitted on a frequency channel not transmitting the color video signals.

13. The terminal of claim 12 wherein the terminal is adapted to be held by a user of the terminal.

14. The terminal of claim 12 wherein the terminal includes a cursor pointing device disposed on the terminal so as to allow ease of manipulation by a user holding the terminal.

15. The terminal of claim 12 wherein the terminal includes a left cursor button and a right cursor button, both the left button and the right button located on the terminal so as to allow ease of manipulation by a user holding the terminal.

16. The terminal of claim 12 further comprising a keyboard.

17. The terminal of claim 16 wherein the terminal includes grooves and the keyboard includes flanges, the grooves and flanges allowing the keyboard to be attached to the terminal for ease of storage.

18. The terminal of claim 12 wherein the three color video signals are frequency hopped among the predetermined number of frequency channels.

19. The terminal of claim 12 wherein the communication circuitry further comprises:

a processor for establishing a forward link signal for receiving data from the base station to the terminal, for establishing a reverse link signal for transmitting data from the terminal to the base station, and for controlling frequency hopping of the forward link and the reverse link among the predetermined number of frequency channels.

20. The terminal of claim 12 wherein the frequency hopped RF communication link further carries user interface signals from the terminal on one of the predetermined number of frequency channels.

21. A system for providing remote access to a personal computer, the personal computer including a main processing unit, a video display and audio speakers, comprising:
   a base station for connecting to the personal computer and communicating over a frequency hopped radio frequency (RF) communication link comprising a predetermined number of frequency channels; and
   a remote terminal comprising a video display panel and user input devices, the terminal adapted to remotely interface with the base station using the frequency hopped RF communication link;
   wherein when the remote terminal is in an active state the base station is adapted to route to the remote terminal a video signal produced by the main processing unit with the video signal being transmitted to the remote terminal utilizing the RF communication link, the video signal comprising a video synchronization signal, a red color signal, a green color signal and a blue color signal, the video synchronization signal and each of the color signals assigned to one of the predetermined number of frequency channels and wherein the video synchronization signal is transmitted on a frequency channel not transmitting the color signals.

22. A frequency hopped method of radio transmission of video signals comprising the steps of:
   determining a first group of video transmission channel frequencies;
   transmitting a video signal frequency modulated onto the first group of video channel frequencies, the video signal comprises a red color signal, a blue color signal and a green color signal, each of the color signals carried by one of the first group of video transmission channel frequencies;
   transmitting video synchronization signals on one of the first group of video transmission channel frequencies not carrying the color signals;
   determining a second group of video transmission channel frequencies;
   transmitting the video signal frequency modulated onto the second group of video channel frequencies, each of the color signals carried by one of the second group of video transmission channel frequencies; and
   transmitting video synchronization signals on one of the second group of video transmission channel frequencies not carrying e color signals.

23. The method of claim 22 wherein the first group of channel frequencies and the second group of channel frequencies are selected from a predetermined number of channel frequencies available for communication by transmitting a known data sequence over each of the available channel frequencies and assessing each of the available channel frequencies based upon a comparison of a received data sequence with the known data sequence.

24. The method of claim 22 wherein the step of first transmitting a video signal includes the sub-step of:
   transmitting an audio signal frequency modulated onto a sub-carrier frequency of one of the first group of video channel frequencies.

25. The method of claim 24 wherein the audio signal comprises a left audio signal and a right audio signal, and the left audio signal and the right audio signal frequency are modulated onto two of the three video channel frequencies carrying the color signals.

26. The method of claim 22 wherein the first group and the second group of video channel frequencies are selected from a predetermined plurality of channel frequencies.

27. The method of claim 26 wherein the step of determining a first group further comprises:
   assessing the predetermined plurality of channel frequencies to determine transmission quality of the channel frequencies.

* * * * *